United States Patent [19]

Testerman

[11] Patent Number: 5,337,871

[45] Date of Patent: Aug. 16, 1994

[54] CALIBRATION METHOD FOR TRANSMISSION CONTROL CLUTCHES

[75] Inventor: Michael D. Testerman, Dearing, Kans.

[73] Assignee: Deere & Company, Moline, Ill.

[21] Appl. No.: 136,863

[22] Filed: Oct. 18, 1993

[51] Int. Cl.$^5$ .................................... F16D 25/061
[52] U.S. Cl. .................. 192/85 R; 192/85 CA
[58] Field of Search ............. 192/85 R, 85 C, 85 CA, 192/70.12

[56] References Cited

U.S. PATENT DOCUMENTS

| | | | |
|---|---|---|---|
| 4,646,891 | 3/1987 | Braun | 192/0.032 |
| 4,793,454 | 12/1988 | Petzold et al. | 192/85 R X |
| 4,855,913 | 8/1989 | Brekkestran et al. | 364/424.1 |
| 4,899,858 | 2/1990 | Cote et al. | 192/0.09 |
| 4,967,385 | 10/1990 | Brekkestran et al. | 364/571.03 |
| 4,989,471 | 2/1991 | Bulgrien | 192/0.096 X |
| 5,035,312 | 7/1991 | Asayama et al. | 192/85 R |
| 5,082,097 | 1/1992 | Goeckner et al. | 192/32 |
| 5,224,577 | 7/1993 | Falck et al. | 192/0.092 |

OTHER PUBLICATIONS

U.S. patent application Ser. No. 07/521,504 (Bulgrien et al.).

SAE Technical Paper Ser. No. 861212, Sep. 1986, Goodbar, J. E. and Testerman, M. D., entitled "The Design and Development of a Four Speed Powershift Transmission with Electronic Clutch Pressure Modulation".

Ford New Holland, "Part 5–Transmission Systems (Post Mar. 1990)", published 1990 1–7, co-pending with App. Ser. No. 07/521,808 filed May 10, 1990.

*Primary Examiner*—Richard M. Lorence
*Assistant Examiner*—Andrea Pitts

[57] ABSTRACT

A vehicle powershift transmission has a lube oil passage which communicates lube oil to a clutch pack. Communication of lube oil is controlled as a function of the engagement state of the clutch pack. The hydraulic control pressure required to initially engage the clutch pack is determined or calibrated by a method wherein the lube oil pressure is monitored while the clutch control pressure is gradually increased. When the lube oil pressure reaches a certain level corresponding to clutch pack engagement, the current value of the control pressure is saved as the calibration pressure.

3 Claims, 3 Drawing Sheets

CALIBRATION METHOD FOR TRANSMISSION CONTROL CLUTCHES

BACKGROUND OF THE INVENTION

This invention relates to a calibrating method or method of determining an operating pressure required to achieve initial engagement of electro-hydraulically operated transmission brake or clutch elements in a powershift transmission.

Some manufacturers have used versions of electrohydraulic transmission controls with some success. Some such control systems have utilized proportionally controlled valves, but most such systems have used mostly simple on-off valves, with just one or two transmission control clutches controlled by proportional valves. For example, a powershift transmission sold by Ford New Holland, Ltd. has two modulating valves which control three different transmission control clutches. These valves are in turn controlled by an electronic controller. Such a proportional control allows a clutch element to be modulated during engagement and release of that element, and the controller provides the ability to vary the modulation for a particular element for each unique shift. Another system which includes on-off valves and at least one proportional control valve is described in U.S. Pat. No. 4,855,913, issued 8 Aug. 1989 to Brekkestran et al.

In such systems with proportional control valves it is possible and desirable to accurately control the torque capacities of the clutches during engagement. While the electrical command supplied to the control valve may be very precise, manufacturing tolerances in the valves and transmission cause large variations on an actual vehicle. If it is known what electrical command corresponds to the initial clutch engagement pressure which causes a clutch to just begin carrying torque, then this command could be used to modify the shift command for that clutch during shifting to provide optimized control.

For example, the Brekkestran reference discloses that the key parameters in the control system include the initial clutch engagement pressure (represented by DC-MAX) and the fast-fill clutch delay (represented by T1). The Brekkestran reference further states that DC-MAX and T1 must be determined by laboratory or field tests. However, the Brekkestran reference does not disclose any method for determining these values.

A calibrating method or a method of determining the pressure necessary to achieve clutch engagement in a microprocessor-based transmission control system is described in U.S. Pat. No. 4,989,471, issued on 5 Feb. 1991 to Bulgrien. The Bulgrien method includes braking the transmission output shaft, then gradually increasing the clutch pressure and saving a value corresponding to the clutch pressure at which the engine speed begins to decrease. However, this method requires use of the vehicle brakes to prevent rotation of the transmission output shaft. Such a procedure could be dangerous if the vehicle brakes are not applied or if the brakes fail, because then undesired vehicle motion could result during calibration. The Bulgrien patent also illustrates an alternate method of calibrating a clutch by sensing when the clutch transmits sufficient torque to move the vehicle. This alternate method requires that the vehicle be placed in a position where vehicle motion is not a safety concern, and the results of such a method will vary depending upon the terrain on which the vehicle is placed.

U.S. Pat. No. 5,082,097, issued on 21 Jan. 1992 to Goeckner et al. relates to a transmission controller for a transmission which includes a solenoid valve operated clutch and a solenoid valve for operating the clutch. The Goeckner et al. system also discloses a calibrating system or a system for determining a current signal corresponding to the point at which the clutch begins to transmit torque. This system includes a vehicle monitor for producing a threshold signal when the clutch begins to carry a predetermined amount of torque and a memory for storing a calibration value corresponding to the value of the current at which the clutch carries the predetermined amount of torque. However, this system requires a controller which generates a controlled current signal and a current monitoring circuit which generates a signal which corresponds to the current flow to the solenoid valve. Furthermore, the threshold signal in this system is either vehicle movement or engine droop, and the calibration procedure does not appear to involve disconnecting an output shaft of the transmission from a vehicle drive shaft. As a result, the calibration procedure described in Goeckner et al. would appear to be similar to the methods described in the Bulgrien patent, and would appear to have to involve allowing vehicle movement during calibration, or applying the vehicle brakes during calibration.

Another calibration method is described in U.S. Pat. No. 5,224,577, issued 7 June 1993 to Falck et al. and assigned to the assignee of the present application. With this method, the transmission output shaft is disconnected from the drive wheels and the engine is run at a predetermined speed. Depending upon which transmission control element is to be calibrated, certain ones of the plurality of the control clutches, other than the control clutch being calibrated, are engaged in order to prevent rotation of a part of the control clutch being calibrated. Then the duty cycle of a pulse-width-modulated voltage signal applied to the proportional control valve is gradually modified to increase the pressure applied to the control clutch being calibrated while the engine speed is monitored. When the monitored engine speed droops by a predetermined amount, a value corresponding to the pressure applied to the proportional control valve is stored as the clutch calibration pressure value. In order to determine the fill volume of an element, the element is fully pressurized while the engine speed is monitored. The time required for this for this pressurization to cause a decrease in engine speed will represent the volume of fluid required to fill the element so that it begins to carry torque. While this method does not require that the brakes be applied to prevent vehicle motion, it does require an engine speed sensor and it requires that the engine be run at a certain speed.

SUMMARY OF THE INVENTION

An object of the present invention is to provide a method of determining the operating pressure required to achieve initial engagement of a pressure operated brake or clutch element of a vehicle powershift transmission.

Another object of the invention is to provide such a method which can be used without requiring monitoring or sensing of engine speed.

Another object of the invention is to provide such a method which can be used without requiring that the engine be run at a certain speed.

These and other objects are achieved by the present invention wherein a control system for a vehicle powershift transmission is calibrated. The hydraulically pressure required to achieve initial engagement of a pressure operated brake or clutch element of a vehicle powershift transmission is determined or calibrated by a method wherein a lube oil pressure is monitored while the clutch operating pressure is gradually increased. When the lube oil pressure reaches a certain level, a value is saved corresponding to the calibration pressure.

DETAILED DESCRIPTION

Figure 1:
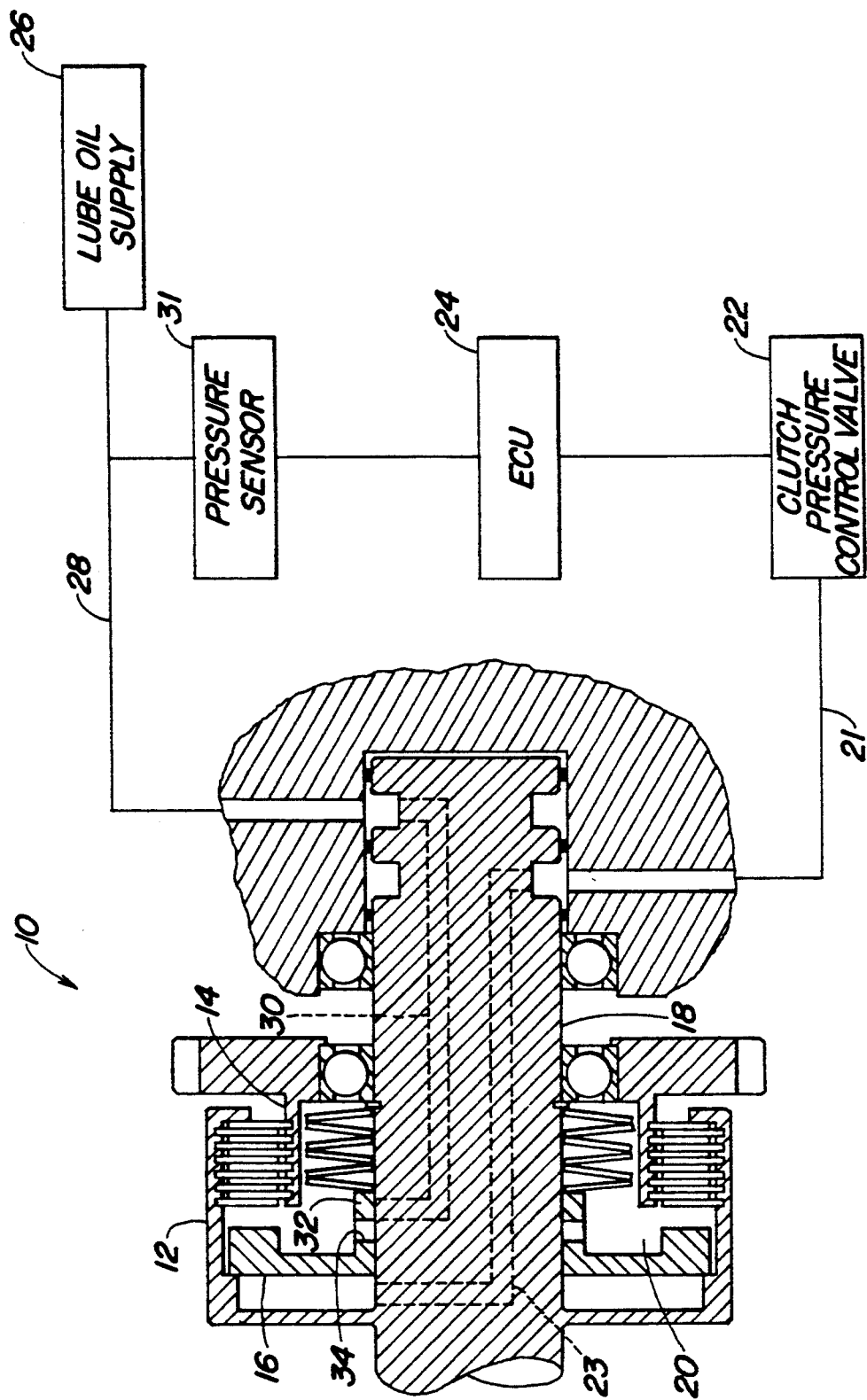
FIG. 1 illustrates a transmission clutch pack and a control system to which the present invention is applicable.
Figure 2:
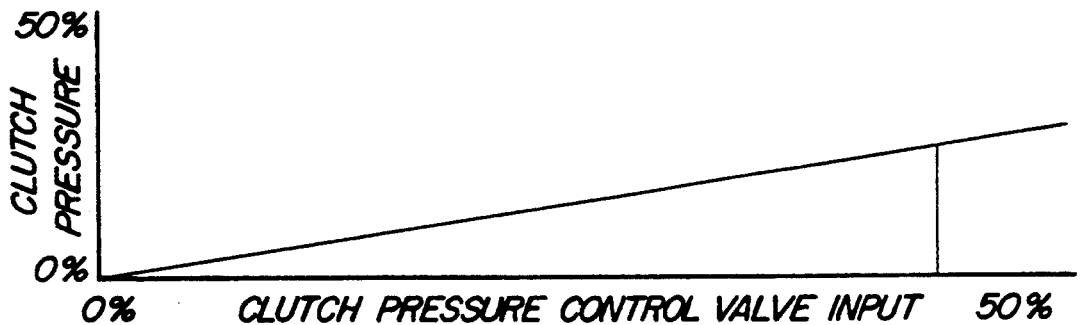
FIG. 2 is a graphical representation of clutch operating pressure as a function of an input to a clutch pressure control valve.
Figure 3:
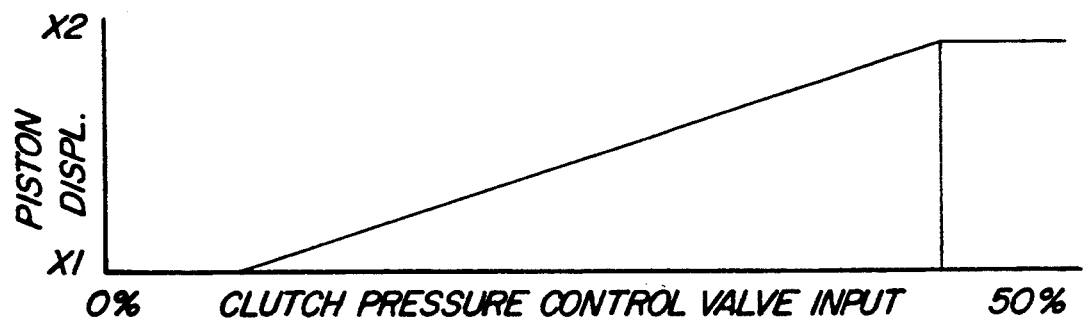
FIG. 3 is a graphical representation of clutch piston displacement as a function of an input to a clutch pressure control valve.
Figure 4:
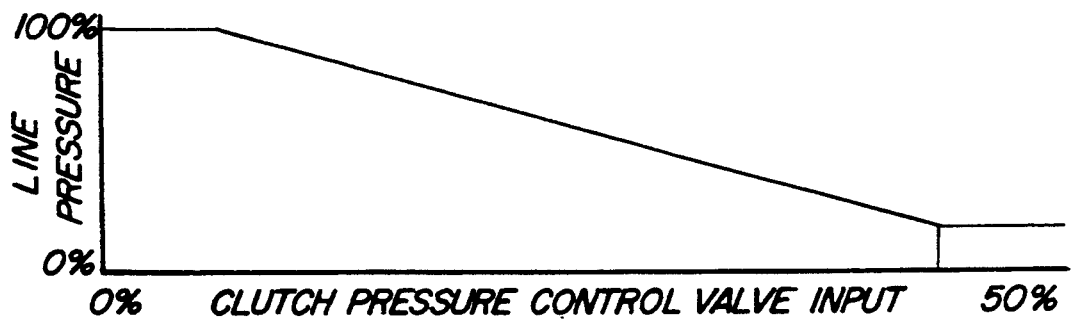
FIGS. 4 is a graphical representation of clutch lube pressure as a function of an input to a clutch pressure control valve.

As shown in FIG. 1, a powershift transmission clutch pack 10 includes a pair of brake or clutch elements 12 and 14 and a piston element 16 mounted on a shaft 18. Clutch element 12 and piston 16 enclose a chamber 20. Clutch pack 10 is operated by a solenoid operated proportional control valve 22. The control valve 22, in turn, is controlled by an electronic control unit (ECU) 24. Operating pressure is communicated from valve 22 to the piston 16 via line 21 and a passage 23 which extends through the shaft 18.

The clutch pack 10 is preferably part of a transmission (not shown) such as described in U.S. patent application Ser. No. 07/938,926, filed 31 Aug. 1992 for J. P. McAskill and assigned to the assignee of the present application, now issued U.S. Pat. No. 5,249,475, issued Oct. 5, 1993. The valves 22 may be two-stage electrohydraulic valves as described in U.S. Pat. No. 4,741,364, issued 3 May 1988 to Stoss et al. and assigned to applicant's assignee.

A source of lubricating oil 26 is communicated to the surface of the shaft 18 adjacent to the clutch pack 10 by line 28 and a passage 30 through the shaft 18. A pressure sensor 31 senses the pressure in line 28 and provides a pressure signal to the ECU. The piston 16 has a cylindrical base 32 which is slidable over the shaft. A radial bore 34 in the base 32 cooperates with the passage 30 to control communication of lube oil to the clutch pack 10. When the piston 16 is in the position shown in FIG. 1 and the clutch pack 10 is fully disengaged, the base 32 blocks passage 30. As the operating pressure increases, the piston moves to the right viewing FIG. 1, and eventually bore 34 will move to a position wherein bore 34 is fully aligned with the outlet of passage 30, thus fully opening the passage 30 to the clutch pack 10.

Calibration Method

Before this calibration method is performed, the operator should apply the service or parking brakes (not shown) for the vehicle (not shown). The engine should be running at least at idle speed, but the engine speed need not be set accurately to a particular speed. The ECU performs a pressure calibration algorithm such as illustrated by the logic flow diagram of FIG. 5. This algorithm or method will determine the valve pressure command signal (applied to valve 22) required to just engage the clutch pack 10.

Figure 5:
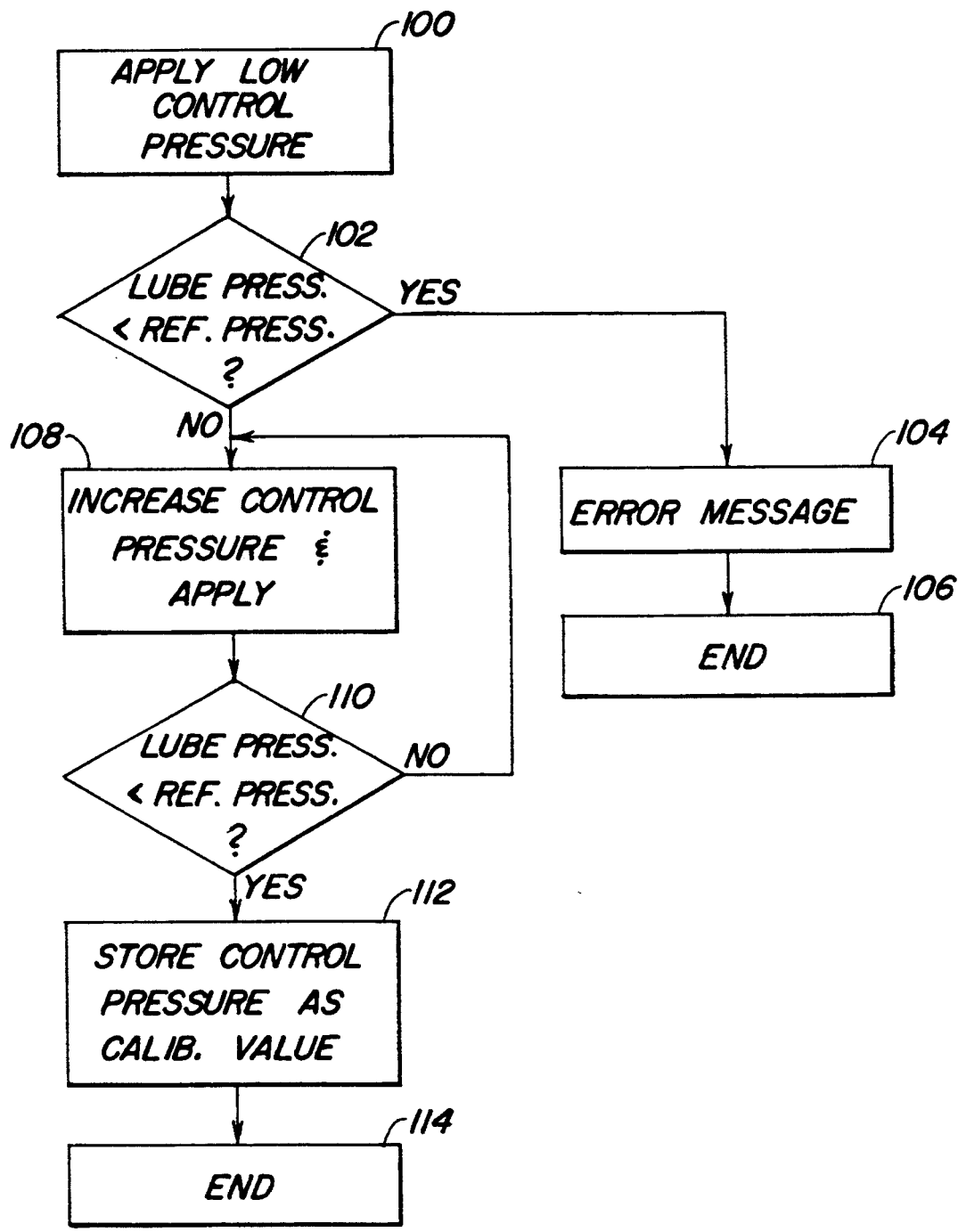
FIG. 5 is a simplified logic flow diagram of a pressure calibration algorithm which is performed by the present invention.

Referring now to FIG. 5, in step 100 a low control pressure is applied to the clutch pack 10. In step 102 the lube pressure signal from sensor 31 is compared to a reference lube pressure value. If the lube pressure is less than the reference pressure, then an error message is generated in step 104 and the method is ended by step 106. If the lube pressure is not less than the reference pressure, then step 108 causes the control pressure to be increased and causes this increased control pressure to be applied to the clutch pack 10. In step 110 the lube pressure signal from sensor 31 is again compared to a reference lube pressure value. If the lube pressure is not less than the reference pressure, then the algorithm returns to step 108. If the lube pressure is less than the reference pressure, then step 112 stores the current control pressure value as the pressure calibration value, and step 114 ends operation.

The above algorithm can be summarized as follows. The clutch operating pressure is gradually modified or increased to move the piston 16 to the right viewing FIG. 1. Meanwhile, the signal from pressure sensor 31 is monitored and the sensed lube oil pressure in the lube oil passage 32 is periodically compared to a reference pressure. When the sensed lube pressure falls to the reference value, it means that the piston has moved to a position wherein it engages the clutch pack 10. At this point, the present level of the input signal to the control valve 22 is stored as the fill pressure calibration value. This method is preferably performed automatically by a computer program executed by the ECU 24.

While the invention has been described in conjunction with a specific embodiment, it is to be understood that many alternatives, modifications and variations will be apparent to those skilled in the art in light of the foregoing description. Accordingly, this invention is intended to embrace all such alternatives, modifications and variations which fall within the spirit and scope of the appended claims. For example, the clutch fill time, which corresponds to volume of oil required to fill and engage a transmission control clutch, could also be determined by monitoring the clutch lube pressure. Also, this calibration method could automatically be periodically be executed by the ECU at various times during operation of the vehicle, in addition to being executed upon start-up of the vehicle.

I claim:

1. In a powershift transmission having a pressure operated clutch pack for shifting the transmission, the clutch pack comprising a pair of clutch elements mounted on a shaft, one of the clutch elements being axially movable over the shaft into and out of engagement with the other clutch element, a piston axially movable over the shaft to move the one clutch element in response to a clutch control pressure, a lube system having a source of lubricating oil, a lube passage extending through the shaft for communicating lube oil to the clutch pack and a lube orifice in the piston, the lube orifice and the lube passage cooperating to prevent communication of lube oil to the clutch pack when the clutch elements are disengaged and to open communication of lube oil to the clutch pack when the clutch elements are engaged, a method of determining a parameter associated with initial engagement of the clutch elements comprising:

gradually modifying the parameter to gradually move the one clutch element into engagement with the other clutch element;

periodically sensing pressure in the lube oil passage and comparing the lube oil pressure to a reference pressure value; and storing the parameter as a calibration value when the sensed lube oil pressure is equal to the reference pressure value.

2. The method of claim 1, wherein:

the parameter is the control pressure required to initially engage the clutch elements.

3. In a powershift transmission having a pressure operated clutch pack for shifting the transmission, the clutch pack comprising a pair of clutch elements mounted on a shaft, one of the clutch elements being axially movable over the shaft into and out of engagement with the other clutch element, a piston axially movable over the shaft to move the one clutch element in response to a clutch control pressure, a lube system having a source of lubricating oil, a lube passage extending through the shaft for communicating lube oil to the clutch pack and a lube orifice in the piston, the lube orifice and the lube passage cooperating to prevent communication of lube oil to the clutch pack when the clutch elements are disengaged and to open communication of lube oil to the clutch pack when the clutch elements are engaged, a method of determining the control pressure required to initially engage the clutch element, the method comprising:

gradually modifying the control pressure to gradually move the one clutch element into engagement with the other clutch element;

periodically sensing pressure in the lube oil passage and comparing the lube oil pressure to a reference pressure value; and storing the control pressure as a calibration value when the sensed lube oil pressure is equal to the reference pressure value.

\* \* \* \* \*